United States Patent [19]

Nikolaev et al.

[11] 3,918,442
[45] Nov. 11, 1975

[54] SURGICAL INSTRUMENT FOR ULTRASONIC JOINING OF BIOLOGICAL TISSUE

[76] Inventors: Georgy Alexandrovich Nikolaev, Pionersky Pereulok, 3, kv. 12; Vladimir Ivanovich Loschilov, ulitsa Kibalchicha, 11, kv. 83; Sergei Mikhailovich Volkov, Zoologicheskaya ulitsa, 3, kv. 92; Viktor Grigorievich Vedenkov, Chernomorsky bulvar, 4, kv. 349, all of Moscow; Valery Dmitrievich Leonichev, Oktyabrskoe shosse, 405, Ljubertsy Moskovskoi oblasti; Valentin Alexandrovich Polyakov, ulitsa Klary Tsetkin 17, kv. 48; Mstislav Vasilievich Volkov, ulitsa Stroitelei, 6, korpus 1, kv. 63, both of Moscow, all of U.S.S.R.

[22] Filed: Oct. 3, 1974

[21] Appl. No.: 511,800

Related U.S. Application Data

[63] Continuation of Ser. No. 404,913, Oct. 10, 1973, abandoned.

[52] U.S. Cl............................ 128/92 G; 128/303.1
[51] Int. Cl.²........................................... A61F 5/04
[58] Field of Search........... 128/24 A, 303 R, 303.1, 128/83, 92 G; 32/50, 53

[56] References Cited
UNITED STATES PATENTS
3,636,943  1/1972  Balamuth.......................... 128/24 A OTHER PUBLICATIONS
Servida – Tempo (A–XXXII–N. 48) Nov. 28, 1970.
V. A. Poljakov et al. Acta Chirurgiae Orthopaedicae ut Traumatologiae Cochoslovaca 38-5-1971.

*Primary Examiner*—Lawrence W. Trapp
*Attorney, Agent, or Firm*—Holman & Stern

[57] ABSTRACT

An ultrasonic instrument for use in welding and depositing biological osseous tissue. The instrument is essentially a source of ultrasonic oscillations, comprising an oscillator and a half-wave concentrator which passes gradually into a welding tip not placed in direct contact with both fragments of osseous tissue, which are being joined and which have biological material preliminarily placed therebetween. The welding tip is essentially a blade made from a titanium alloy and having flat faces made bevel at an angle of 90° ± 45° relative to the longitudinal axis from the free end of the tip to the point at which the latter starts gradually passing into the concentrator.

4 Claims, 6 Drawing Figures

SURGICAL INSTRUMENT FOR ULTRASONIC JOINING OF BIOLOGICAL TISSUE

This is a continuation of abandoned application Ser. No. 404,913, filed Oct. 10, 1973.

BACKGROUND OF THE INVENTION

The present invention relates generally to surgical instruments, particularly, to surgical instruments adapted for joining biological tissue, and more specifically, it relates to those actuated by ultrasound.

Attempts were made to employ in surgery, apparatus for ultrasonic joining of biological tissue, comprising mainly a concentrator connected to an ultrasonic oscillations source and having a welding tip performing longitudinal mechanical oscillations of ultrasonic frequency in the course of operation and brought in direct contact with biological tissue fragments.

The present inventors made a general review of such conventional apparatus at the 3rd Scientific Conference on Surgical Application of Ultrasound in Traumatology, Orthopedy and Thoracal Surgery (cf. Abstracts, June 1972, Moscow).

OBJECTS AND SUMMARY OF THE INVENTION

Therefore, it is an object of the present invention to provide a surgical instrument for joining biological tissue fragments which will ensure a long service life and convenient use.

Another object of the present invention is to provide a surgical instrument for joining biological tissue fragments which ensures a strong joint and maximal penetration of the binder material into the osseous tissue under the action of ultrasonic oscillations.

Still another object of the present invention is to provide an ultrasonic surgical instrument which will ensure easy formation of a weld joint in the event of bone fragments connection being made with the aid of a transplant.

Yet another object of the present invention is to provide an ultrasonic surgical instrument ensuring, when joining tissue, treatment of a preset area of a weld conglomerate.

The above-mentioned and other objects are accomplished by a surgical instrument for ultrasonic welding and deposition of biological tissue, comprising a concentrator connected to an ultrasonic oscillations source and passing gradually conjugating into a welding tip not brought in direct contact with or spaced from both fragments of biological tissue being joined, a binder material preliminarily placed therebetween, which surgical instrument is characterized, according to the present invention, in that the welding tip is essentially a metal blade having at least one of its flat edges arranged at an angle of 90° ± 45° to the longitudinal axis of the tip and extending from the sector of smooth conjugation with the concentrator.

This embodiment of the welding tip of the surgical instrument allows for most effective use of a tip having a relatively small working portion to ultrasonic oscillations to be applied to a maximal surface possible.

Another embodiment of the present invention resides in that the blade of the welding tip of the surgical instrument has two opposite bevel edges at the section extending from the free end of the tip to the place of conjugation with the concentrator.

The latter embodiment of the instrument is particularly applicable for providing maximal simultaneous penetration of monomer into the surface of both the tissue fragments being joined and the transplant.

The present invention also provides an embodiment, according to which, in order to deposit the binder material into a biological tissue cavity, the welding tip is made as a blade expanding from the concentrator towards the free end and being symmetrical relative to the blade longitudinal axis, thereby providing for a required increase in the area of the tip working edge.

Finally, according to the present invention, the concentrator with the welding tip-blade is made from a titanium alloy, liquid monomer-cyacrine mixed with homorogeneous or heterogeneous bone shavings being used as the binder material.

BRIEF DESCRIPTION OF THE DRAWINGS

The following description of exemplary embodiments of the surgical instrument for ultrasonic joining of biological tissue is given with reference to the accompanying drawings, in which.

DETAILED DESCRIPTION OF THE PREFERRED EMBODIMENTS

Figure 1:
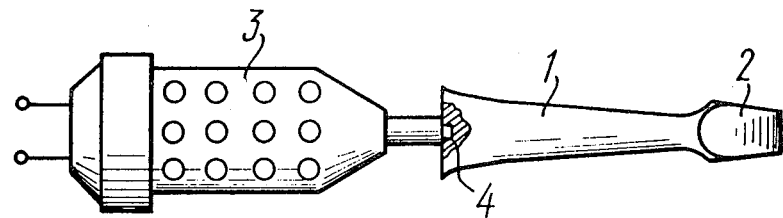
FIG. 1 is a view in elevation, partly broken away, showing an acoustic head with the ultrasonic instrument for joining biological tissue.

The present invention particularly relates to a design of the operating element of an ultrasonic instrument. The present instrument is intended for joining biological osseous tissue. The ultrasonic instrument (FIG. 1) is essentially a titanium stem 1 with exponentially changing cross section with the thin end thereof having a working portion defined as a welding tip 2. The instrument is a member of an acoustic system. It is secured to an acoustic head 3 by means of a threaded joint 4 and is interchangeable. The ultrasonic instrument is a component of a medical apparatus intended for ultrasonic cutting, welding and deposition of live biologic tissue.

Figure 2:
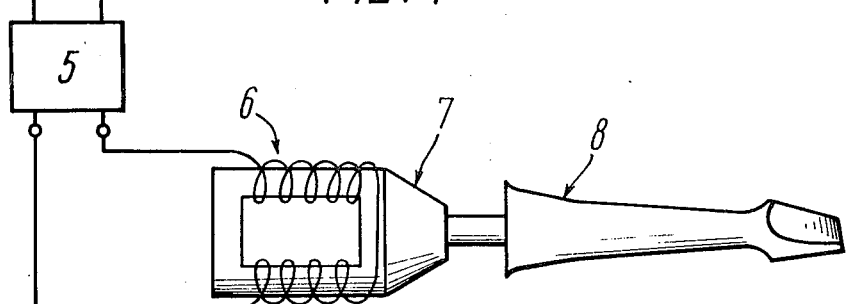
FIG. 2 is a view in elevation showing an acoustic system of the apparatus for ultrasonic joining of biological tissue, according to the invention.

The apparatus comprises an ultrasonic oscillator 5 (FIG. 2) rated substantially at 250 kW, three interchangeable acoustic heads (for welding, deposition and cutting) and a set of instruments for ultrasonic treatment of biological tissue.

The apparatus set includes a vacuum box (not shown) sarving for the sterilization of acoustic heads and instruments.

Figure 3:
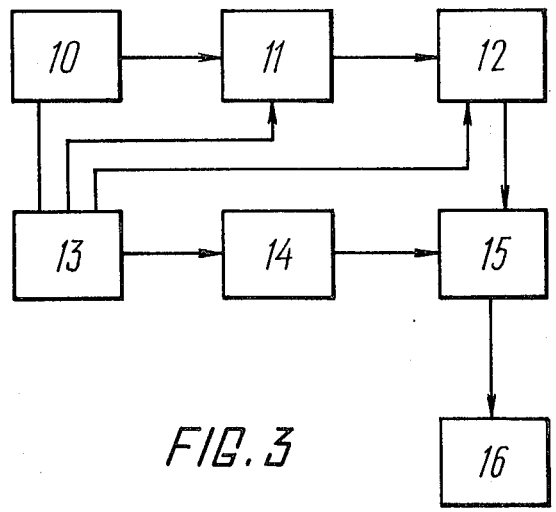
FIG. 3 is a block diagram of the apparatus for ultrasonic joining of biological tissue, as shown in FIG. 2.

The acoustic system (FIG. 2) of the apparatus comprises the oscillator 5 of electric oscillations, a magnetostrictive transducer 6, a half-wave concentrator 7 in the shape of a tapered cylinder and an interchangeable half-wave concentrator instrument 8. The system operates in the resonance mode. The magnetostrictive transducer 6 is fixedly connected to the tapered cylindrical concentrator 7, with the transducer being an element of the acoustic head. The transducer 7 is defined by cemented nickel plates and has an excitation winding 9. The ultrasonic oscillator 5, and the block diagram thereof illustrated in FIG. 3, comprises a master oscillator 10, power preamplifier 11, main power amplifier 12, power pack 13, magnetization unit 14 and switching unit 15. An acoustic head with the instrument concentrator is connected across the output of the ultrasonic oscillator. The ultrasonic oscillator 5 (FIG. 2) is supplied from a 50 Hz 220 V A.C. mains. Power consumption is under 0.45 kWA. The oscillator is rated at 250 W, 26.5 kHz.

The apparatus operates as follows:

The acoustic head 3 (FIG. 1) with the ultrasonic instrument 2, for example, the welding tip, attached thereto, is plug-connected to the output of the ultrasonic oscillator 5. The oscillator 5 is switched into operation by means of a toggle switch (not shown).

With the toggle switch in the "ON" position, the ultrasonic oscillator 5 (FIG. 2) starts generating current alternating with an ultrasonic frequency.

The current is impressed across the winding 9 of the magnetostrictive transducer which converts electric oscillations into mechanical oscillations of ultrasonic frequency. The mechanical oscillations thus produced are amplified by the tapered cylindrical concentrator 7, as well as by the interchangeable concentrator instrument 8 and imparted to the working portion 2 which is directly performing the joining of biological tissue. The surgeon, while holding the acoustic head with the instrument, moves the working portion over the surface to effect the joining thereof. The working portion oscillates at am amplitude of up to 60 microns.

The process of formation of a welded joint in ultrasonic welding of osseous tissue is essentially an involved entity of physico-chemical processes accompanied by heat evolution.

As a result of acoustic flows and intermittent pressures exerted by ultrasonic oscillations on the binder material applied onto the surface of osseous tissue the monomer bonds become ruptured, which is followed by the formation of free radicals.

Moreover, under the action of intermittent pressures, the liquid monomer permeates the pores and capillaries of the osseous tissue. The process of cyacrine permeation into the osseous tissue is accompanied by a chemical interaction of cyacrine with the amino-groups of the bone collagen.

In order to increase the area of interaction between cyacrine and the collagen of the osseous tissue, the bone surface to be welded is treated prior to welding with a 6% solution of hydrochloric acid, thus permitting calcium salts to be removed and make the collagen accesible.

Further action of the ultrasonic oscillations on the welded conglomerate (cyacrine and bone shavings) causes polymerization and hardening of liquid cyacrine.

The process of weld formation takes about 20 to 30 seconds depending on the volume of conglomerate.

The welded joint thus obtained will reliably hold the bone fragments together during the whole period of bone tissue regeneration. In the course of time the welded joint will be resorbed and substituted by callus.

One of the main factors influencing the strength of welded joints in osseous tissue is the degree of penetration of the liquid monomer into the bone.

It has been experimentally found that maximum penetration depth of the liquid cyacrine into the osseous tissue being welded is obtained when the ultrasonic oscillations act on the binder material in a direction normal to the surface of the bone.

The welding tip according to the present invention is made in the form of a blade. This configuration of the tip and the geometry of its blade discussed below greatly facilitate formation of a welded joint.

Figure 4:
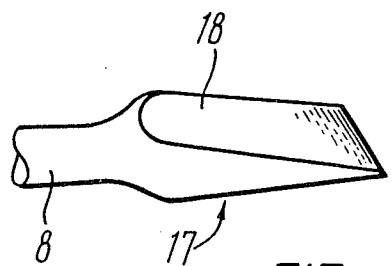
FIG. 4 shows a general fragmentary view of a welding tip-blade, according to the invention.

In order to create ultrasonic oscillations oriented normally to the surface of the welded bone, the welding tip blade 17 (FIG. 4) is made bevel, i.e., having at least one flat face 18 inclined at an angle of 90° ± 45° with respect to the longitudinal axis of the tip and extends from the sector of smooth conjugation with the concentrator 8 tip.

Figure 5:
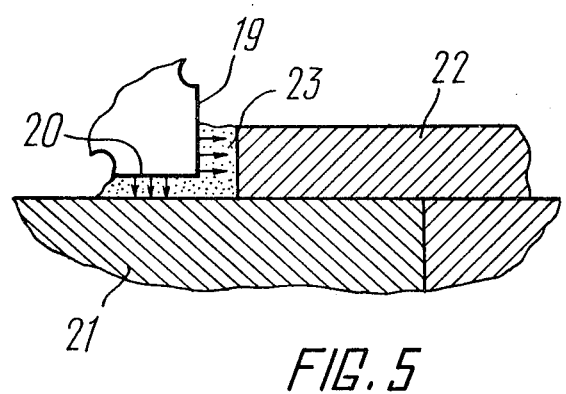
FIG. 5 illustrates partly in section and partly in elevation the welding of bone fragments with the aid of a transplant by using the tip, according to the invention.

The ultrasonic instrument according to the present invention having a welding tip blade with two opposite flat faces 19 and 20 made bevel at the above-specified angle (FIG. 5) is particularly applicable for joining bone fragments 21 and 22 by means of a transplant.

In this case, maximum simultaneous penetration of cyacrine into the surface of both the transplant 23 and the welded bone fragments 21 and 22 is achieved.

Figure 6:
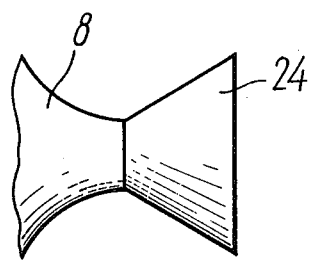
FIG. 6 illustrates in elevation, partly broken away, an embodiment of the tip-blade for ultrasonic deposition by the instrument, according to the invention.

In performing an ultrasonic deposition operation in which it is required to apply oscillations to the largest possible area of weld conglomerate, the welding tip blade 24 (FIG. 6), according to the invention, is defined as a blade expanding in the direction from the concentrator to its free end and is symmetrical relative to the blade longitudinal axis, thereby providing for a required increase in the area of the tip working edge.

One skilled in the art can readily understand that the scope of the invention is not limited to the above-described embodiments thereof and any variants and modifications thereof are possible depending on a concrete practical case of its application. However, the embodiments of the instrument tip cited hereinabove have been experimentally tested and have shown good and stable results.

The concentrator together with the welding tip blade is made of a titanium alloy; the material used as binder is liquid monomer - cyacrine mixed with homogenous or heterogenous bone shavings.

We claim:

1. A surgical instrument for ultrasonic welding and deposition of biological tissue, comprising an ultrasonic oscillations source; a concentrator connected to the ultrasonic oscillations source and gradually conjugating with a welding tip spaced from direct contact with both fragments of biological tissue being joined and a binder material preliminarily placed there between; said welding tip being defined as a metal blade having at least one flat face inclined at an angle of 90° ± 45° relative to the tip longitudinal axis and extending from the sector of smooth conjugation with the concentrator.

2. The surgical instrument as claimed in claim 1, wherein the blade of the welding tip has two opposite flat faces made bevel along the sector of smooth conjugation with the concentrator.

3. The surgical instrument as claimed in claim 1, wherein the welding tip is defined as a blade expanding from the concentrator towards the free end and being symmetrical relative to the longitudinal axis for depositing binder material into the biological cavity, thereby ensuring a required increase in the area of the working edge of the tip.

4. The surgical instrument as claimed in claim 1, wherein the concentrator with said blade of the welding tip is a titanium alloy, and liquid monomer-cyacrine mixed with homogeneous bone shavings is the binder material.

* * * * *